(12) United States Patent
Zhou et al.

(10) Patent No.: US 10,110,810 B2
(45) Date of Patent: Oct. 23, 2018

(54) SUPER-RESOLUTION IMAGE ACQUISITION METHODS AND APPARATUS

(71) Applicant: BEIJING ZHIGU TECH CO., LTD., Beijing (CN)

(72) Inventors: Liang Zhou, Beijing (CN); Lin Du, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 0 days.

(21) Appl. No.: 15/510,820

(22) PCT Filed: Aug. 26, 2015

(86) PCT No.: PCT/CN2015/088108
§ 371 (c)(1),
(2) Date: Mar. 13, 2017

(87) PCT Pub. No.: WO2016/050126
PCT Pub. Date: Apr. 7, 2016

(65) Prior Publication Data
US 2017/0280052 A1    Sep. 28, 2017

(30) Foreign Application Priority Data

Sep. 30, 2014  (CN) .......................... 2014 1 0521674

(51) Int. Cl.
*H04N 5/335*    (2011.01)
*H04N 3/14*    (2006.01)
(Continued)

(52) U.S. Cl.
CPC ....... *H04N 5/23232* (2013.01); *G06T 3/4069* (2013.01); *G06T 7/11* (2017.01); *H04N 5/2254* (2013.01); *G06T 2207/10004* (2013.01)

(58) Field of Classification Search
CPC .................................................. H04N 5/23232
See application file for complete search history.

(56) References Cited

U.S. PATENT DOCUMENTS 7,009,645 B1 *  3/2006  Sandini ................. G01J 1/4228
                                                        250/208.6
2001/0052939 A1 * 12/2001 Riedel ...................... G06T 1/00
                                                            348/294
(Continued)

FOREIGN PATENT DOCUMENTS

CN      1874499 A      12/2006
CN    101345870 A       1/2009
(Continued)

OTHER PUBLICATIONS

International Search Report and Written Opinion for Application No. PCT/CN2015/088108, dated Nov. 11, 2015, 8 pages.

*Primary Examiner* — Anthony J Daniels

(57) ABSTRACT

Embodiments of the present application disclose various super-resolution image acquisition methods and apparatus. One of the super-resolution image acquisition methods comprises: acquiring an image of a to-be-shot scene by an image sensor; changing pixel point distribution of the image sensor at least once; separately acquiring an image of the to-be-shot scene by the image sensor changed each time; and acquiring a super-resolution image of the to-be-shot scene according to the acquired images. According to the embodiments of the present application, by fusing multiple differentiated images of the same scene acquired by a single image sensor in different time periods, a super-resolution image is acquired. The solution is simple and easy to implement, and may better meet users' diversified actual application needs.

19 Claims, 8 Drawing Sheets

(51) Int. Cl.
    *H04N 5/232*     (2006.01)
    *H04N 5/225*     (2006.01)
    *G06T 7/11*     (2017.01)
    *G06T 3/40*     (2006.01)

(56) References Cited

U.S. PATENT DOCUMENTS

| | | | |
|---|---|---|---|
| 2003/0137585 A1* | 7/2003 | Mahon | G06T 3/4069 |
| | | | 348/135 |
| 2008/0129855 A1* | 6/2008 | Vitsnudel | H04N 5/23232 |
| | | | 348/302 |
| 2008/0151089 A1 | 6/2008 | Street et al. | |
| 2011/0268370 A1 | 11/2011 | Matsumoto et al. | |
| 2012/0159996 A1* | 6/2012 | Sutton | G03B 17/00 |
| | | | 65/406 |
| 2012/0274815 A1 | 11/2012 | Matsumoto | |
| 2014/0093185 A1 | 4/2014 | Liang et al. | |
| 2014/0160231 A1 | 6/2014 | Middleton et al. | |
| 2016/0019329 A1* | 1/2016 | Eldesouki | G06F 17/5072 |
| | | | 716/124 |

FOREIGN PATENT DOCUMENTS

| | | |
|---|---|---|
| CN | 103020897 A | 4/2013 |
| CN | 203225818 U | 10/2013 |
| CN | 104063856 A | 9/2014 |
| CN | 104159025 A | 11/2014 |

\* cited by examiner

SUPER-RESOLUTION IMAGE ACQUISITION METHODS AND APPARATUS

CROSS-REFERENCE TO RELATED APPLICATIONS

This application is a national phase application of International Application No. PCT/CN2015/088108, filed on Aug. 26, 2015, which claims the benefit of priority to Chinese Patent Application No. 201410521674.6, filed on Sep. 30, 2014, and entitled "Super-resolution Image Acquisition Methods and Apparatuses," each of which is herein incorporated by reference in its entirety.

TECHNICAL FIELD

The present application relates to the field of image processing technologies, and in particular, to various super-resolution image acquisition methods and apparatus.

BACKGROUND

Resolution is one of the important indexes for evaluating image quality. To improve image resolution, software processing may be performed on multiple low-resolution images obtained by photographing the same scene whose contents are similar but spatio and/or temporal information is not completely the same, to generate a super-resolution image.

Super-resolution images are widely used, for example, a super-resolution image may be applied to, but is not limited to: restoring high frequency information lost in different acquisition scenes, such as out-of-focus, motion blur, non-ideal sampling, etc., and even can be configured to restore high frequency spatial information beyond a diffraction limit of an optical system. Therefore, the study on a technology of acquiring a super-resolution image attracts general attention of technical personnel.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

The present application provides various super-resolution image acquisition methods and apparatus.

In one aspect, embodiments of the present application provide a super-resolution image acquisition method, comprising:

acquiring an image of a scene by an image sensor;

changing pixel point distribution of the image sensor at least once;

separately acquiring an image of the scene by the image sensor changed each time; and acquiring a super-resolution image of the scene according to the acquired images.

In another aspect, the embodiments of the present application further provide a super-resolution image acquisition apparatus, comprising:

an original image acquisition module, configured to acquire an image of a scene by an image sensor;

a pixel point distribution change module, configured to change pixel point distribution of the image sensor at least once;

an adjustment image acquisition module, configured to separately acquire an image of the scene by the image sensor changed each time; and a super-resolution image acquisition module, configured to acquire a super-resolution image of the scene according to the acquired images.

According to the technical solutions provided in the embodiments of the present application, an image is acquired by an image sensor before pixel point distribution is adjusted, then the pixel point distribution of the image sensor is changed at least once, and after each change, an image of the same scene is then separately acquired by the changed image sensor. This is equivalent to acquiring a group of images of the same scene at different time periods, which are similar in content but not completely the same in acquired information about details. A super-resolution image may be generated by performing software processing such as fusing on this group of images, and resolution of the super-resolution image is higher than that of each image of the group of images. In view of this, according to the technical solutions provided in the embodiments of the present application, a super-resolution image may be acquired without using multiple cameras or multiple image sensors, and the solutions are simple and easy to implement, and may better meet users' diversified actual application needs.

These and other advantages of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Figure 1A:
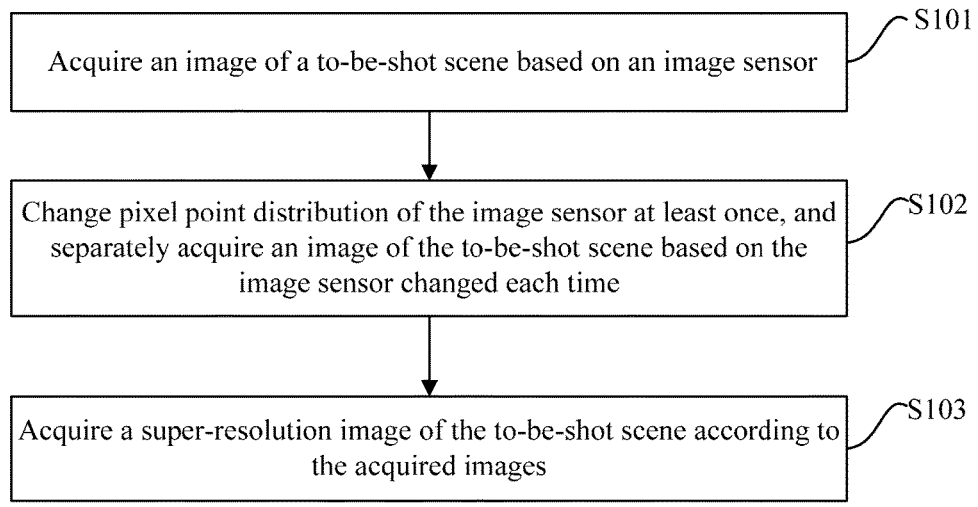
FIG. 1a is a flowchart of a super-resolution image acquisition method according to one embodiment of the present application.

Those skilled in the art should understand that, elements in the accompanying drawings are merely shown for simplicity and clearness, and may not be drawn proportionally. For example, the sizes of some elements in the accompanying drawings may be enlarged relative to other elements, so as to help to improve understanding of the embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementations of the present application are further described in detail below with reference to the accompanying drawings (in which like elements are denoted by like reference numerals) and embodiments. The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

FIG. 1a is a flowchart of a super-resolution image acquisition method according to one embodiment of the present application. The super-resolution image acquisition method provided in this embodiment of the present application may be performed by a super-resolution image acquisition apparatus, and the super-resolution image acquisition apparatus may perform static or dynamic image processing control by executing the super-resolution image acquisition method during applications, which comprise, but are not limited to, phototaking, camera shooting, photographing, and video monitoring. A device presentation form of the super-resolution image acquisition apparatus is not limited. For example, the super-resolution image acquisition apparatus may be a separate part, and the part cooperates and communicates with an imaging device such as a camera, a video camera, a mobile phone, or a wearable camera; or, the super-resolution image acquisition apparatus may be integrated into an imaging device as a functional module, which is not limited in this embodiment of the present application.

Specifically, as shown in FIG. 1a, a super-resolution image acquisition method provided in this embodiment of the present application comprises:

S101: Acquire an image of a to-be-shot scene by an image sensor.

In an initial state, pixel points of the image sensor are distributed evenly. By performing processing such as focus and exposure on a to-be-shot scene by an imaging device such as a camera, a mobile phone, or a video camera, an image of the to-be-shot scene may be acquired by an image sensor, in which pixel points are distributed evenly, of the imaging device. Resolution of different parts of the acquired image is the same.

S102: Change pixel point distribution of the image sensor at least once, and separately acquire an image of the to-be-shot scene by the image sensor changed each time.

The image sensor is an image sensor in which pixel point distribution is adjustable, for example, a flexible image sensor. The flexible image sensor comprises a flexible substrate and multiple image sensor pixels (that is, pixel points) forming on the flexible substrate, where the flexible substrate may make changes such as expansion and contraction, or bending to adjust relative position distribution of pixel points of the flexible substrate when meeting a certain condition.

The pixel point distribution of the image sensor may be adjusted once or many times, so as to change the pixel point distribution of the image sensor once or many times. After each change, the pixel point distribution of the image sensor is uneven distribution, and current pixel point distribution of the image sensor is different from any pixel point distribution changed before.

Each time the pixel point distribution of the image sensor is changed, an image of the to-be-shot scene is acquired by the image sensor with changed pixel point distribution. If the pixel point distribution of the image sensor is changed many times, after the pixel point distribution is changed each time, an image of the to-be-shot scene will be acquired by the image sensor with changed pixel point distribution each time.

Pixel points of the image sensor after the pixel point distribution is changed are distributed unevenly. Therefore, among images of the to-be-shot scene separately acquired by the image sensor, resolution of different parts of each image may have differentiated distribution. For example, a local part is relatively clear, while another local part is relatively unclear.

S103: Acquire a super-resolution image of the to-be-shot scene according to the acquired images.

After S101 to S102, at least two images may be acquired, that is, an image acquired by the image sensor in a state in which pixel points are distributed evenly, where resolution of different parts of the image is the same; and at least one image acquired by the image sensor in a state in which at least one pixel point is distributed unevenly, where resolution of different parts of each of the at least one image may have differentiated distribution, and resolution of a local part of the image is high while resolution of another local part of the image is low.

The acquired at least two images form a group of images which are obtained by shooting the same scene, and similar in content but not completely the same in acquired information about details. A super-resolution image may be generated by performing software processing such as fusing on such a group of images, and resolution of the super-resolution image is higher than that of each image of the group of images.

According to the technical solutions provided in the embodiments of the present application, an image is acquired by an image sensor before pixel point distribution is adjusted, then the pixel point distribution of the image sensor is changed at least once, and after each change, an image of the same scene is then separately acquired by the changed image sensor. This is equivalent to acquiring a group of images of the same scene at different time periods, which are similar in content but not completely the same in acquired information about details. A super-resolution image may be generated by performing software processing such as fusing on this group of images, and resolution of the super-resolution image is higher than that of each image of the group of images. In view of this, according to the technical solutions provided in the embodiments of the present application, a super-resolution image may be acquired without using multiple cameras or multiple image sensors, and the solutions are simple and easy to implement, and may better meet users' diversified actual application needs.

In the foregoing technical solution, a method for changing pixel point distribution of the image sensor is very flexible, which is not limited in this embodiment of the present application.

An optional implementation of changing the pixel point distribution of the image sensor is aimed at changing the pixel point distribution of the image sensor from an initial state of even distribution to an uneven distribution state, so as to adjust the pixel point distribution of the image sensor flexibly.

For example, the changing pixel point distribution of the image sensor at least once comprises increasing an average pixel point density of a first imaging region of the image sensor at least once.

In this embodiment of the present application, the first imaging region is a part of an imaging region of the image sensor; which part of the imaging region of the image sensor the first imaging region is specifically may be determined randomly or determined according to an actual need, and the determining manner is very flexible and is not limited in this embodiment of the present application. For example, the first imaging region may be a continuous distribution region of the image sensor, and may be, but is not limited to a central region, a top-left-corner region, a bottom-right-corner region, or the like of the image sensor. For example, the first imaging region may comprise multiple imaging sub-regions, and the multiple imaging sub-regions are dispersively distributed in the image sensor, for example, multiple imaging sub-regions of the image sensor, such as a top-left imaging sub-region, a bottom-left imaging sub-region, a top-right imaging sub-region, and a bottom-right imaging sub-region are used as the first imaging region in this embodiment of the present application.

According to the solution, the pixel point distribution of the image sensor is adjusted, to cause the number of pixel points in the first imaging region of the image sensor to increase and the pixel points to be distributed more densely, that is, an average pixel point density of the first imaging region increases. At this time, a sub-image, corresponding to the first imaging region, in an image of the same scene acquired by the image sensor is richer in details and higher in resolution, while resolution of other sub-images of the image is lower, thereby forming an image in which resolution is distributed variedly. The pixel point distribution of the image sensor may be adjusted once; or the pixel point distribution of the image sensor may be adjusted many times. For example, an average pixel point distribution density may be increased successively. For example, an average pixel point density of an image sensor adjusted next time is greater than an average pixel point density of the image sensor adjusted last time.

In this embodiment of the present application, after pixel point distribution of the image sensor is changed at least once, pixel points within the first imaging region are distributed evenly or unevenly. That is to say, after the pixel point distribution of the image sensor is changed each time, pixel points within the first imaging region may be evenly distributed at equal intervals, and may also be distributed unevenly, that is, a part is sparse while a part is dense, which is not limited in this embodiment of the present application.

For example, the changing pixel point distribution of the image sensor at least once comprises decreasing an average pixel point density of the first imaging region of the image sensor at least once.

According to the solution, pixel points in the first imaging region of the image sensor are decreased, to cause the pixel points within the first imaging region to be sparser. Because the image sensor is a whole, if an average pixel point density of the first imaging region decreases, an average pixel point density of another imaging region of the image sensor (which might as well be referred to as "a second imaging region") except the first imaging region increases. Resolution of a sub-image, corresponding to the first imaging region, in an image of the same scene acquired by the image sensor is lower, while a sub-image corresponding to the second imaging region is richer in details and higher in resolution, thereby forming an image in which resolution is distributed variedly.

The pixel point distribution of the image sensor may be adjusted once; or the pixel point distribution of the image sensor may be adjusted many times. For example, an average pixel point distribution density may be decreased successively. As an example, an average pixel point density of an image sensor adjusted next time is less than an average pixel point density of the image sensor adjusted last time, etc.

Figure 2A:
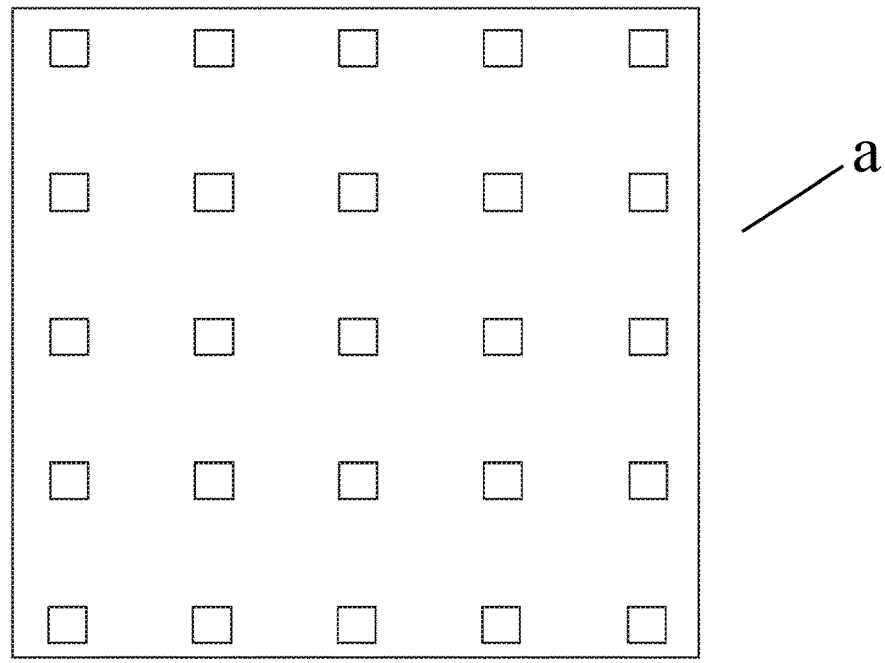
FIG. 2a is an example of an image acquired by an image sensor in which pixel points are distributed evenly according to one embodiment of the present application.
Figure 2B:
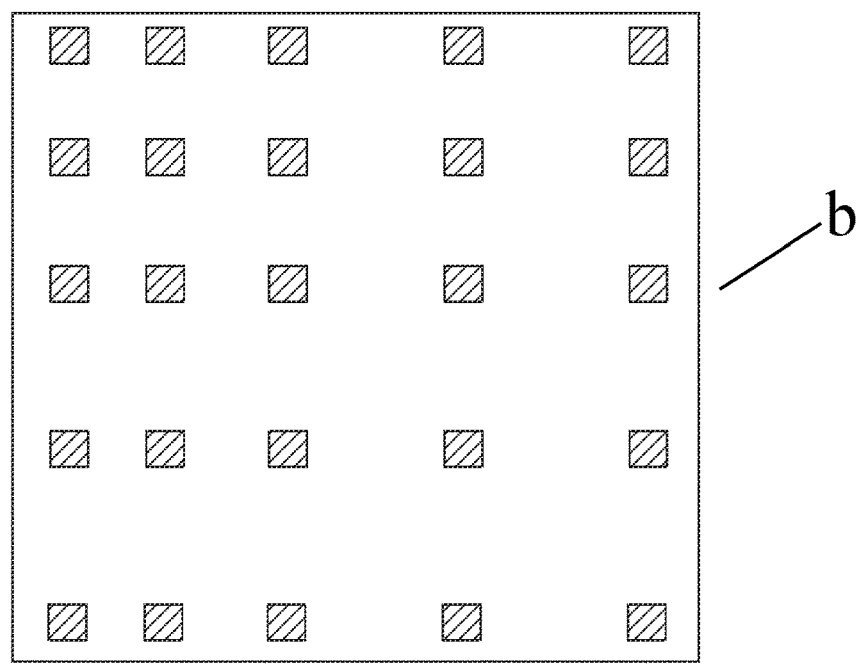
FIG. 2b is an example of an image acquired by an image sensor in a state after even distribution of pixel points is changed according to one embodiment of the present application.
Figure 2C:
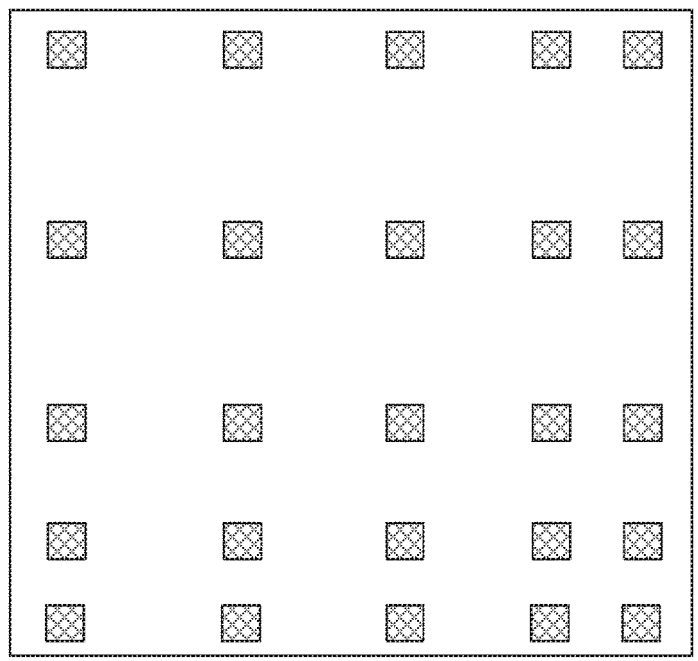
FIG. 2c is an example of an image acquired by an image sensor in another state after even distribution of pixel points is changed according to one embodiment of the present application.
Figure 2D:
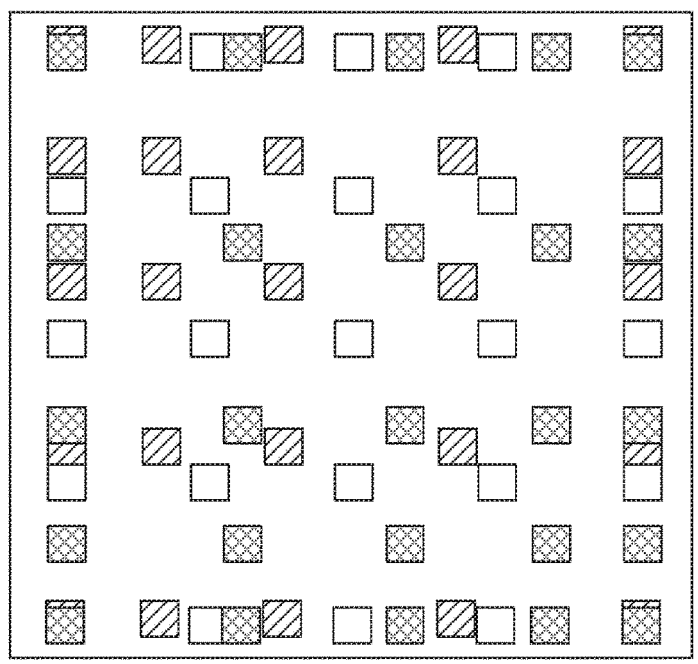
FIG. 2d is an example of a super-resolution image according to one embodiment of the present application.

For example, the changing pixel point distribution of the image sensor at least once comprises increasing an average pixel point density of the first imaging region of the image sensor at least once, and decreasing an average pixel point density of the first imaging region of the image sensor at least once. For example, an image a as shown in FIG. 2a may be acquired by an image sensor in which pixel points are distributed evenly; then, an average pixel point density of the first imaging region is increased once (or many times), and an image b of the same scene is acquired by the image sensor obtained after increase, and resolution of a sub-image, corresponding to the first imaging region, of the image b is higher, while resolution of a sub-image corresponding to a second imaging region is lower, as shown in FIG. 2b; and afterwards, an average pixel point density of the first imaging region is decreased once (or many times), and an image c of the same scene is acquired by the image sensor obtained after decrease, and resolution of a sub-image, corresponding to the first imaging region, of the image c is lower, while resolution of a sub-image corresponding to the second imaging region is higher, as shown in FIG. 2c. The acquired at least two images are fused. For example, the image a, the image b, and the image c are fused, and details of the images complement each other. A part, which lacks details, of one image may be complemented by another image, and details of different parts of a scene are refined to varying degrees, which is equivalent to improving resolution of an image, composed of different parts, of the same scene, thereby obtaining a super-resolution image d. As shown in FIG. 2d, resolution of the super-resolution image d is higher than resolution of any one of the image a, the image b, and the image c.

Another optional implementation of changing the pixel point distribution of the image sensor is aimed at performing targeted adjustment on an imaging region, which corresponds to a local part of a to-be-shot scene, of the image sensor, so as to adjust the pixel point distribution of the image sensor flexibly.

For example, the acquisition method further comprises: determining an imaging region, corresponding to a first region, of the image sensor. The first region is a local part of the to-be-shot scene. Correspondingly, the changing pixel point distribution of the image sensor at least once comprises: changing pixel point distribution of the determined imaging region at least once.

When an image of a to-be-shot scene is acquired by an image sensor, pixels of the image sensor are evenly distributed, and image resolution of different regions of the scene acquired by the image sensor is the same. However, in some scenes, generally, different regions of the scene are of different significance and/or importance for a user, that is, the user has different requirements for imaging quality of different regions of the to-be-shot scene. For example, in a character shooting scene, a user is more interested in a human face in the scene than in scenery in the scene, and therefore, has higher requirements for resolution of human face imaging.

To this end, this embodiment of the present application provides a manner of, for a local part of a to-be-shot scene (that is, the first region), changing an imaging region, corresponding to the first region, of an image sensor and acquiring images of the same scene many times in different time periods, to acquire a group of images of the same scene that are similar in content but different in richness of details of a sub-image corresponding the first region. Optionally, the changing pixel point distribution of the determined imaging region at least once comprises: increasing an average pixel point density of the determined imaging region at least once. At least one image with higher resolution and richer details is acquired by increasing the average pixel point density of the determined imaging region. By combining imaging of the images, a super-resolution image of the same scene is acquired, which may improve imaging quality of a part, corresponding to the first region, of the acquired super-resolution image.

Optionally, in the technical solution provided in this embodiment of the present application, the super-resolution image acquisition method further comprises: determining the first region. According to the solution, a local part (for example, a region with higher requirements for image spatial resolution, or a region with lower requirements for image spatial resolution) of a current to-be-shot scene may be predetermined as the first region according to an actual need, which may better meet users' personalized application needs.

The manner of determining the first region is very flexible and is not limited in this embodiment of the present application. An optional implementation manner may be that the first region is determined according to a preview image of the to-be-shot scene acquired by the image sensor. According to the solution, the first region is determined based on the preview image, which may improve convenience of use for a user.

A specific implementation of determining the first region based on the preview image is also very flexible.

For example, the first region may be determined according to information of a region of interest (ROI) of the preview image, that is, ROI determination information may be acquired based on a preview image of the image sensor about the to-be-shot scene; and a region, corresponding to the ROI determination information, of the to-be-shot scene is determined as the first region. The ROI region may comprise, but is not limited to, one or more of the following: at least one region, selected by a user, of the preview image (that is, a user selection region of the preview image), at least one region, gazed by a user, of the preview image (that is, a user gaze region of the preview image), and an ROI obtained by the image sensor by automatically detecting the preview image. According to the solution, according to the ROI of the preview image, a local part, corresponding to the ROI, of the to-be-shot scene is determined as the first region, to cause determination of the first region to more fit in with actual user demands, which can better meet users' personalized application demands.

For example, the first region may be automatically determined according to an image analysis result of the preview image, that is, an image analysis is performed on a preview image of the image sensor about the to-be-shot scene; and the first region is determined according to a result of the image analysis. In an optional scene, human face recognition may be performed on the preview image, and according to a recognition result, a human face region, corresponding to a human face image, of the to-be-shot scene is determined as the first region. According to the solution, a region, corresponding thereto, of the to-be-shot scene may be determined as the first region according to an image analysis result of the preview image, to cause determination of the first region to be more intelligent, thereby improving efficiency and universality of the determination of the first region.

According to this embodiment of the present application, after an image of the to-be-shot scene is acquired by an image sensor in which pixel points are distributed evenly, pixel point distribution of the image sensor may be changed at least once, so as to acquire at least one other image of the same scene by the image sensor in at least one state in which pixel points are distributed differently. A manner of changing the pixel point distribution of the image sensor may be selected flexibly according to an actual need, which is not limited in this embodiment of the present application. In an optional implementation manner, the image sensor comprises a controllable deformed material portion, and deformation control information of the controllable deformed material portion of the image sensor may be determined according to an expected state of pixel point distribution; and according to the deformation control information, the controllable deformed material portion may be controlled to produce deformation, so as to adjust pixel point distribution of the image sensor correspondingly according to the deformation of the controllable deformed material portion. According to the solution, the pixel point distribution of the image sensor is adjusted by controlling the deformation of the controllable deformed material portion. The solution is simple and easy to implement.

The controllable deformed material portion can produce deformation by changing a certain external effect factor (such as an external field) acting on the controllable deformed material portion, and when the external field acting thereon is cancelled or changed, the deformation of the controllable deformed material portion can be restored.

Figure 1B:
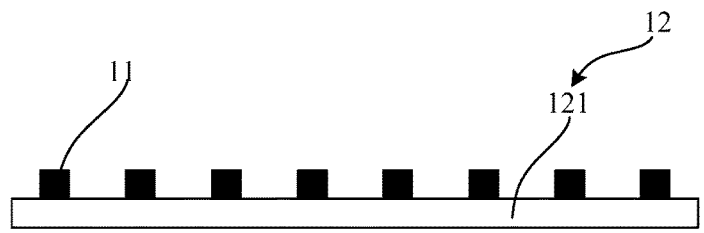
FIG. 1b is a schematic structural diagram of a first image sensor with adjustable pixel density according to one embodiment of the present application.

FIG. 1b is a schematic structural diagram of an image sensor with adjustable pixel density according to one embodiment of the present application. As shown in FIG. 1b, the image sensor with adjustable pixel density provided in this embodiment of the present application comprises multiple image sensor pixels 11 and a controllable deformed material portion 12. The image sensor performs image acquisition by the image sensor pixels 11, the multiple image sensor pixels 11 are array-distributed, and the controllable deformed material portion 12 is separately connected to the multiple image sensor pixels 11; and the controllable deformed material portion 12 may produce deformation under the action of an external field, and density distribution of the multiple image sensor pixels 11 is adjusted correspondingly through the deformation of the controllable deformed material portion 12.

In the technical solution provided in this embodiment of the present application, the controllable deformed material portion can produce deformation by changing a certain external field effect factor on the controllable deformed material portion, when the certain external field effect factor is cancelled or changed, the deformation of the controllable deformed material portion can be restored, and a corresponding control external field acting thereon may be selected as the external field with respect to deformation characteristics of the controllable deformed material portion, for example, the external field comprises, but is not limited to, an external electric field, a magnetic field, a light field and the like. The image sensor pixels may comprise, but are not limited to, at least one photoelectric conversion unit. Each of the image sensor pixels and the controllable deformed material portion may be closely connected in a manner which comprises, but is not limited to, adhesion, in this way, when the controllable deformed material portion produces deformation, spacing between the image sensor pixels will be adjusted correspondingly, thus changing density distribution of the image sensor pixels and achieving the effect of giving differentiated pixel density distribution to different regions of the image sensor according to actual requirements.

During actual applications, an unevenly distributed external field can act on different regions of the controllable deformed material portion, to cause different regions of the controllable deformed material portion to produce deformation differently, thus adjusting the overall density distribution of the image sensor pixels. Optionally, the external field can act on a region where the controllable deformed material portion and the multiple image sensor pixels do not overlap, to cause a region where the controllable deformed material portion and the image sensor pixels overlap not to produce deformation, the density distribution of the image sensor pixels is changed through deformation of other parts of the controllable deformed material portion, and the solution helps to avoid damage to the image sensor pixels caused by deformation of the controllable deformed material portion.

During actual applications, at least one suitable controllable deformed material can be selected as required to prepare the controllable deformed material portion, to cause the controllable deformed material portion to have characteristics of being deformable and having recoverable deformation. Optionally, the controllable deformed material portion is at least prepared from at least one or more of the following controllable deformed materials: piezoelectric materials, electroactive polymers, photodeformation materials and magnetostriction materials.

The piezoelectric material may produce mechanical deformation due to the action of an electric field. A controllable deformed material portion prepared based on the piezoelectric material is hereinafter referred to as a piezoelectric material portion. By use of such a physical property of the piezoelectric material, the embodiment of the present application can determine electric field control information configured to make the piezoelectric material portion produce corresponding mechanical deformation according to, but not limited to, the target pixel density distribution information, control an electric field acting on the piezoelectric material portion according to the electric field control information, to cause the piezoelectric material portion to produce corresponding mechanical deformation, and correspondingly adjust pixel density distribution of the image sensor through the mechanical deformation of the piezoelectric material portion, thus achieving the purpose of adjusting pixel density distribution of the image sensor according to the target pixel density distribution information. The piezoelectric materials may comprise, but are not limited to, at least one of the following: piezoelectric ceramic and piezoelectric crystal. The solution can make full use of the physical property of the piezoelectric material to adjust pixel density distribution of the image sensor.

The Electroactive Polymers (referred to as EAPs) are one kind of polymer materials that can change their shapes or sizes under the action of an electric field. The controllable deformed material portion prepared from the EAPs is hereinafter referred to as an EAP portion. By use of such a physical property of the EAPs, the embodiment of the present application can determine electric field control information configured to make the EAP portion produce corresponding deformation according to, but not limited to, the target pixel density distribution information, control an electric field acting on an EAP layer according to the electric field control information, to cause the EAP layer to produce corresponding deformation, and correspondingly adjust pixel density distribution of the image sensor through the deformation of the EAP layer, thus achieving the purpose of adjusting pixel density distribution of the image sensor according to the target pixel density distribution information. The EAP materials may comprise, but are not limited to, at least one of the following: electronic EAPs and ionic EAPs; the electronic EAPs comprise at least one of the following: ferroelectric polymers (such as polyvinylidene fluoride), electrostrictive grafted elastomers and liquid crystal elastomers; and the ionic EAPs comprise at least one of the following: electrorheological fluids, ionic polymer-metallic composite materials and the like. The solution can make full use of the physical property of the EAPs to adjust pixel density distribution of the image sensor.

The photodeformation materials are one kind of polymer materials that can change their shapes or sizes under the action of a light field. The controllable deformed material portion prepared from the photodeformation materials is hereinafter referred to as a photodeformation material portion. By use of such a physical property of the photodeformation materials, the embodiment of the present application can determine light field control information configured to make the photodeformation material portion produce corresponding deformation according to, but not limited to, the target pixel density distribution information, control a light field acting on the photodeformation material portion according to the light field control information, to cause the photodeformation material portion to produce corresponding deformation, and correspondingly adjust pixel density distribution of the image sensor through the deformation of the photodeformation material portion, thus achieving the purpose of adjusting pixel density distribution of the image sensor according to the target pixel density distribution information. The photodeformation materials may comprise, but are not limited to, at least one of the following: photostrictive ferroelectric ceramics and photodeformation polymers; the photostrictive ferroelectric ceramics comprise, but are not limited to, lead lanthanum zirconate titanate (PLZT) ceramics, and the photodeformation polymers comprise, but are not limited to, photodeformation liquid crystal elastomers. The solution can make full use of the physical property of the photodeformation material to adjust pixel density distribution of the image sensor.

The magnetostriction materials are one kind of magnetic materials that can change a magnetization state thereof under the action of a magnetic field and then change their sizes. The controllable deformed material portion prepared from the magnetostriction materials is hereinafter referred to as a magnetostriction material portion. By use of such a physical property of the magnetostriction materials, the embodiment of the present application can determine magnetic field control information configured to make the magnetostriction material produce corresponding deformation according to, but not limited to, the target pixel density distribution information, control a magnetic field acting on the magnetostriction material portion according to the magnetic field control information, to cause the magnetostriction material portion to produce corresponding deformation, and correspondingly adjust pixel density distribution of the image sensor through the deformation of the magnetostriction material portion, thus achieving the purpose of adjusting pixel point distribution of the image sensor according to the target pixel density distribution information. The magnetostriction materials may comprise, but are not limited to, rare-earth giant magnetostrictive materials, such as alloy $Tbo_{0.3}Dy_{0.7}Fe_{1.95}$ materials using a $(Tb,Dy)Fe_2$ compound as a substrate. The solution can make full use of the physical property of the magnetostriction material to adjust pixel density distribution of the image sensor.

In the technical solution provided in this embodiment of this application, a specific structure and a connection manner of the image sensor pixels and the controllable deformed material portion may be determined according to an actual need, and an actual manner is very flexible.

In an optional implementation, as shown in FIG. 1b, the controllable deformed material portion 12 comprises a controllable deformed material layer 121. The multiple image sensor pixels 11 are array-distributed and connected to one side of the controllable deformed material layer 121. Optionally, it is feasible to choose to directly from the multiple image sensor pixels on the controllable deformed material portion 12 according to actual process conditions, or the multiple image sensor pixels and the controllable deformed material portion 12 can be prepared respectively and can be closely connected in a manner which comprises, but is not limited to, adhesion. The solution has a simple structure and is easy to achieve.

Figure 1C:
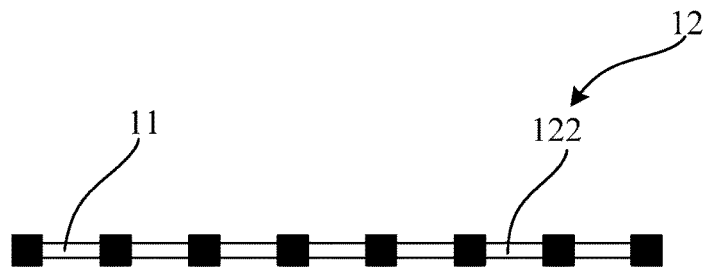
FIG. 1c is a schematic structural diagram of a second image sensor with adjustable pixel density according to one embodiment of the present application.

In another optional implementation, as shown in FIG. 1c, the controllable deformed material portion 12 comprises multiple controllable deformed material connection sub-portions 122. The multiple controllable deformed material connection sub-portions 122 are array-distributed, so as to correspondingly connect the multiple image sensor pixels 11 array-distributed, that is, the multiple image sensor pixels array-distributed are connected into one piece based on the multiple controllable deformed material connection sub-portions array-distributed. Optionally, the multiple controllable deformed material connecting sub-portions may be formed in space regions of pixels of an image sensor pixel array according to an actual process, and the multiple controllable deformed material connecting sub-portions and the corresponding image sensor pixels may be connected in a manner which comprises, but is not limited to, abutment and adhesion. Density distribution of the image sensor pixels may be adjusted by controlling deformation of the multiple controllable deformed material connection sub-portions. the structure is simple and easy to implement.

Figure 1D:
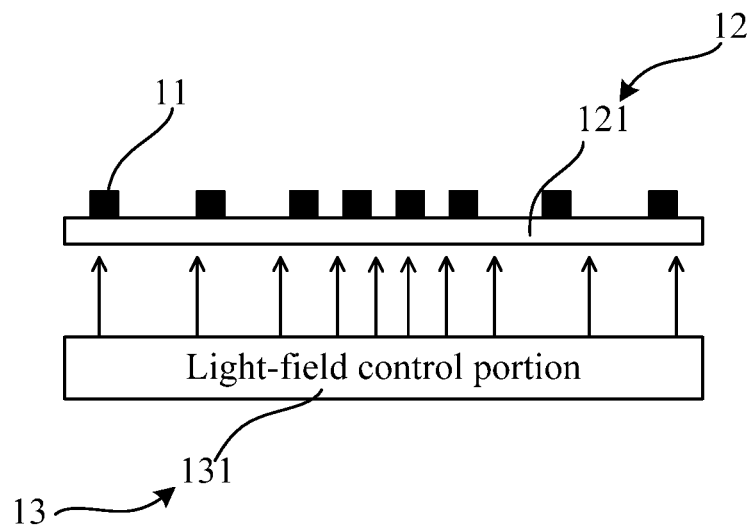
FIG. 1d is a schematic structural diagram of a third image sensor with adjustable pixel density according to one embodiment of the present application.
Figure 1E:
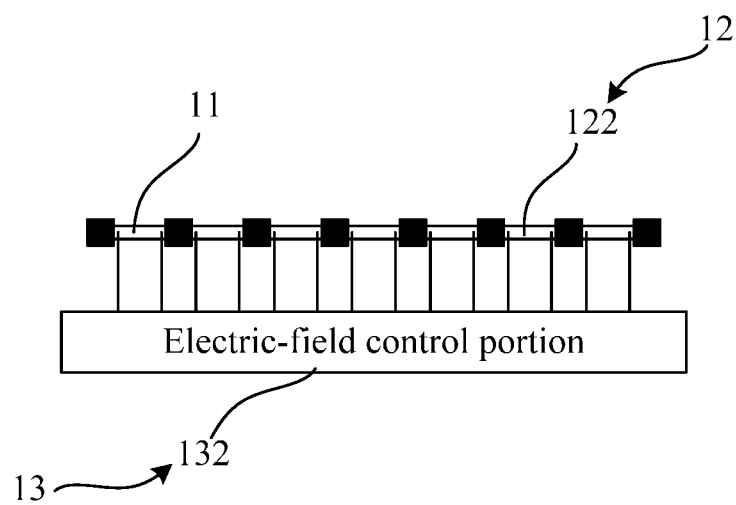
FIG. 1e is a schematic structural diagram of a fourth image sensor with adjustable pixel density according to one embodiment of the present application.

Further, as shown in FIGS. 1d and 1e, the image sensor may further comprise a deformation control portion 13. The deformation control portion 13 is configured to adjust distribution of the external field acting on the controllable deformed material portion 12, so as to control the controllable deformed material portion 12 to produce corresponding deformation. In this way, when the controllable deformed material portion 12 produces deformation, spacing between the image sensor pixels 11 is adjusted correspondingly, thereby changing density distribution of the image sensor pixels 11, and achieving an effect of giving differentiated pixel point distribution to different regions of the image sensor according to actual requirements.

Optionally, as shown in FIG. 1d, the deformation control portion may comprise a light-field control portion 131. The light-field control portion 131 is configured to adjust distribution of an external light field acting on the controllable deformed material portion 12, so as to control the controllable deformed material portion 12 to produce corresponding deformation. In this way, the controllable deformed material portion 12 may comprise a photodeformation material portion at least prepared from photodeformation materials, for example, the photodeformation material portion may comprise a photodeformation material layer at least prepared from the photodeformation materials, or the controllable deformed material portion may comprise multiple photodeformation material connecting sub-portions at least prepared from the photodeformation materials. The light-field control portion 131 excites different regions of the controllable deformed material portion 12 to produce deformation differently by changing light field distribution acting on the photodeformation material portion (in FIG. 1d, the light field with different intensity distribution acting on the controllable deformed material portion 12 is represented through arrow density), and the spacing between the image sensor pixels 11 is adjusted correspondingly through the deformation of the controllable deformed material portion 12, thus changing pixel point distribution of the image sensor pixels 11 and achieving the effect of giving differentiated pixel point distribution to different regions of the image sensor according to actual requirements.

Figure 1F:
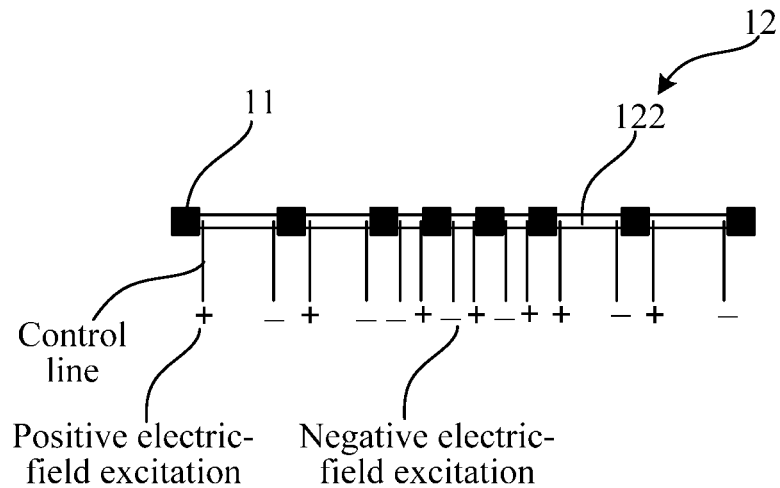
FIG. 1f is an example of a scene where an image sensor adjusts pixel density in the event of uneven light field excitation according to one embodiment of the present application.

Optionally, as shown in FIG. 1e, the deformation control portion may comprise an electric-field control portion 132. The electric-field control portion 132 is configured to adjust distribution of an external electric field that is imposed on the controllable deformed material portion, so as to control the controllable deformed material portion to produce corresponding deformation. In this case, the controllable deformed material portion 12 may comprise a piezoelectric material portion at least prepared from piezoelectric materials (such as a piezoelectric material layer or a piezoelectric material connecting sub-portion), or the controllable deformed material portion 12 may comprise an EAP portion at least prepared from EAPs (such as an EAP layer or an EAP connecting sub-portion). As shown in FIG. 1e, the electric field control portion and the controllable deformed material can be connected through a control line, and the electric field control portion 132 excites different regions of the controllable deformed material portion 12 to produce deformation differently by changing electric field distribution acting on the controllable deformed material portion. If the electric field acting on the controllable deformed material portion 12 is a zero field, the controllable deformed material portion does not produce deformation (might as well be called zero field excitation); if intensity distribution of the electric field acting on the controllable deformed material portion 12 (for example, "+" positive electric field excitation and "−" negative electric field excitation shown in FIG. 1e) is changed to cause the intensity of the electric field acting on different regions of the controllable deformed material portion 12 to vary, as shown in FIG. 1f, in this way, the different regions of the controllable deformed material portion 12 may produce deformation differently, and the spacing between the image sensor pixels 11 is adjusted correspondingly through the deformation of the controllable deformed material portion 12, thus changing the overall pixel density distribution of the image sensor and achieving the effect of giving differentiated pixel density distribution to different regions of the image sensor according to actual requirements.

In this embodiment of the present application, the controllable deformed portion and the deformation control portion may be directly connected, and may also be indirectly connected. The deformation control portion may be a part of the image sensor, or the deformation control portion may also not be a part of the image sensor, and the image sensor may also be connected with the deformation control portion through a reserved pin or interface or the like. The external field acting on the controllable deformed material portion may comprise, but is not limited to, an electric field, a magnetic field, a light field and the like. A hardware or software structure configured to produce the electric field, a hardware or software structure configured to produce the magnetic field, a hardware or software structure configured to produce the light field and the like can be achieved based on corresponding existing technologies according to actual requirements, which is no longer repeated herein in the embodiment of the present application.

Figure 1G:
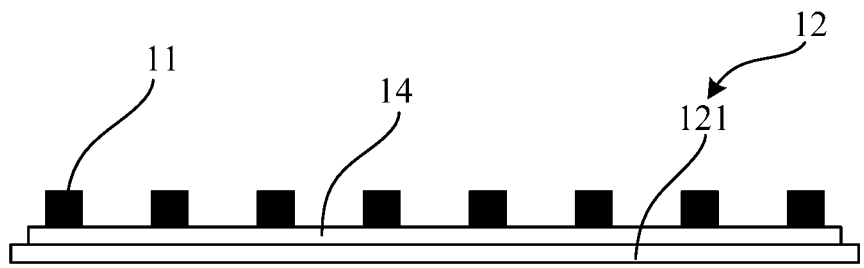
FIG. 1g is a schematic structural diagram of a fifth image sensor with adjustable pixel density according to one embodiment of the present application.
Figure 1H:
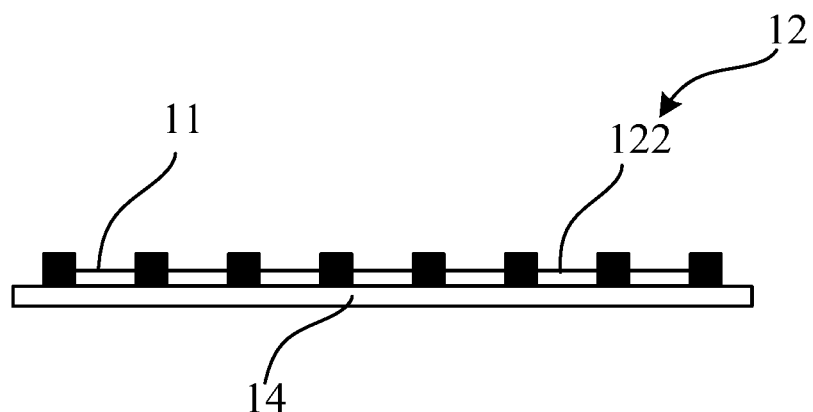
FIG. 1h is a schematic structural diagram of a sixth image sensor with adjustable pixel density according to one embodiment of the present application.

Optionally, the image sensor may further comprise a flexible substrate. The flexible substrate may comprise, but is not limited to, a plastic flexible substrate, which has certain flexibility and can change the shape of the flexible substrate according to requirements. The image sensor pixels and the controllable deformed material portion may be disposed at the same side or different sides of the flexible substrate. For example, as shown in FIG. 1g, the multiple image sensor pixels 11 are connected to one side of a flexible substrate 14, and the controllable deformed material portion (for example, the controllable deformed material layer 121) is connected to the other side of the flexible substrate 14. For example, as shown in FIG. 1h, the multiple image sensor pixels 11 are connected to one side of the flexible substrate 14, and the controllable deformed material portion (for example, the controllable deformed material connection sub-portions 122) is connected to a corresponding image sensor pixel and is located at the same side of the flexible substrate 14 with the image sensor pixels 11. The solution not only can indirectly adjust the overall pixel density distribution of the image sensor by controlling its deformation through the external field acting on the controllable deformed material portion, to achieve adjustable pixel density of the image sensor, but also can flexibly change the shape of the image sensor due to use of the flexible substrate, for example, a plane image sensor is bent to a certain angle to obtain a surface image sensor, thus meeting application demands such as diversified image acquisition and decoration.

Figure 1I:
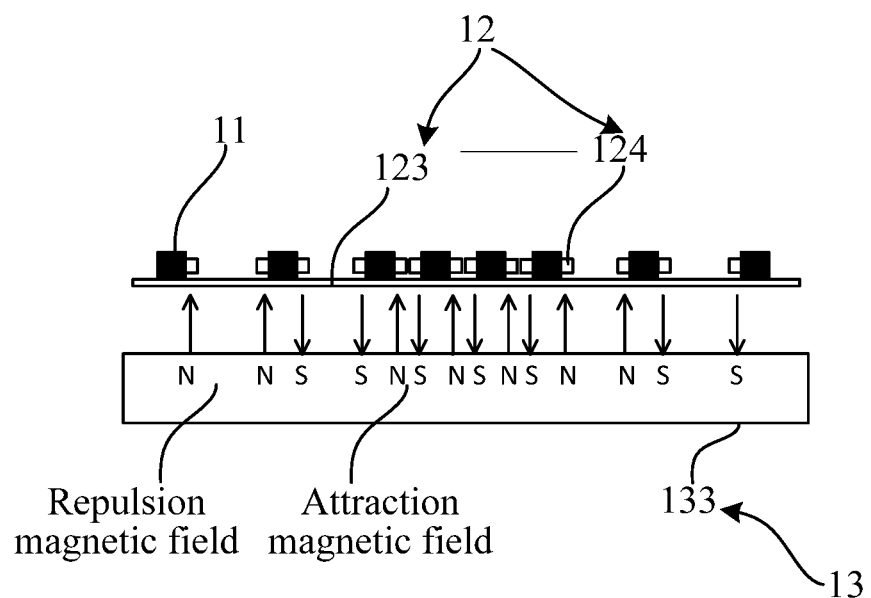
FIG. 1i is a schematic structural diagram of a seventh image sensor with adjustable pixel density according to one embodiment of the present application.

FIG. 1i is a schematic structural diagram of a seventh image sensor with adjustable pixel density according to one embodiment of the present application. In the image sensor as shown in FIG. 1i, the controllable deformed material portion 12 comprises a flexible substrate 123 and multiple permeability magnetic material portions 124; the multiple image sensor pixels 11 are respectively connected with the flexible substrate 123, at least a part of the image sensor pixels 11 are connected with the multiple permeability magnetic material portions 124, the flexible substrate 123 produces corresponding deformation by changing a magnetic field acting on the permeability magnetic material portions 124, and density distribution of the multiple image sensor pixels 11 is correspondingly adjusted through the deformation. For example, a permeability magnetic material portion 124 can be disposed on a side face of each image sensor pixel, and optionally, the image sensor pixel 11 is respectively adhered to the flexible substrate 123 and the permeability magnetic material portion 124. The permeability magnetic material portion may comprise a magnetic pole prepared from a permeability magnetic material, and the permeability magnetic material may comprise, but is not limited to, one or more of a soft magnetic material, a silicon steel sheet, a permalloy, ferrite, an amorphous soft magnetic alloy, and a super-microcrystalline soft magnetic alloy. The permeability magnetic material portion prepared from the soft magnetic material has better permeability, and small residual magnetization after cancellation of the magnetic field facilitates next adjustment.

Further, optionally, the deformation control portion 13 in this embodiment of the present application may further comprise a magnetic-field control portion 133. The magnetic-field control portion 133 is configured to adjust distribution of an external magnetic field acting on the controllable deformed material portion, so as to control the controllable deformed material portion to produce corresponding deformation. For example, when the magnetic field control portion 133 controls the magnetic field (that is, excitation magnetic field) acting on the permeability magnetic material portion 124, as shown in FIG. 1i, a like magnetic pole (NN or SS) repulsion magnetic field or an unlike magnetic pole (NS or SN) attraction magnetic field with certain magnetic field intensity distribution is applied between adjacent image sensor pixels, the poles may produce a corresponding repelling force or attracting force therebetween, the magnetic force is transferred to the flexible substrate 123 to make the flexible substrate 123 produce deformation such as expansion and contraction, thereby resulting in that the spacing between the corresponding image sensor pixels changes and achieving the purpose of adjusting pixel density distribution of the image sensor. The solution achieves adjustable pixel density distribution of the image sensor in combination with scalable deformation characteristics of the flexible substrate and the magnetic field control principle.

Figure 1J:
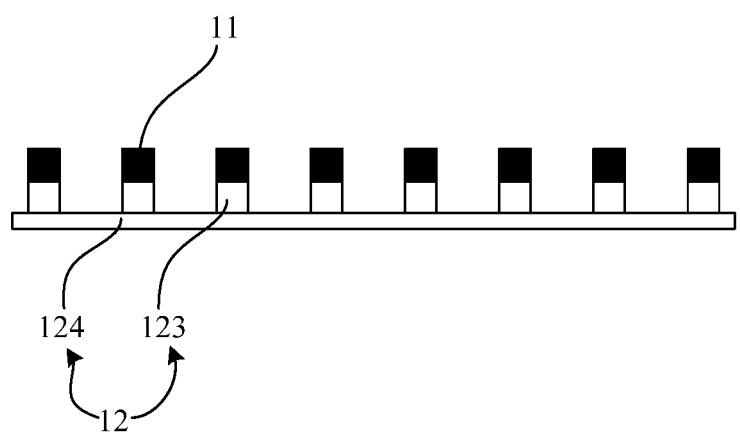
FIG. 1j is a schematic structural diagram of an eighth image sensor with adjustable pixel density according to one embodiment of the present application.

FIG. 1j is a schematic structural diagram of an eighth image sensor with adjustable pixel density according to one embodiment of the present application. In the image sensor as shown in FIG. 1j, the controllable deformed material portion 12 comprises a flexible substrate 123 and multiple permeability magnetic material portions 124; one side of the multiple permeability magnetic material portions 124 is respectively connected with the flexible substrate 123, an opposite face of the multiple permeability magnetic material portions 124 is respectively connected with the multiple image sensor pixels 11 correspondingly, the flexible substrate 123 produces corresponding deformation by changing a magnetic field acting on the permeability magnetic material portions 124, and density distribution of the multiple image sensor pixels 11 is correspondingly adjusted through the deformation. Optionally, the permeability magnetic material portions 124 are adhered to the flexible substrate 123, the image sensor pixels 11 are adhered to the permeability magnetic material portions 124, and when the magnetic field acting on the permeability magnetic material portions 124 changes, the magnetic force is transferred to the flexible substrate 123 to make the flexible substrate 123 produce deformation such as expansion and contraction, thereby achieving the purpose of adjusting pixel density distribution of the image sensor. The solution achieves adjustable pixel density distribution of the image sensor in combination with scalable deformation characteristics of the flexible substrate and the magnetic field control principle.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

Figure 3:
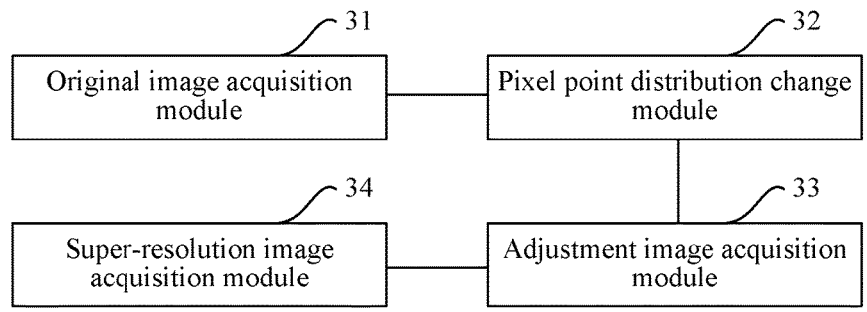
FIG. 3 is a logic block diagram of a super-resolution image acquisition apparatus according to one embodiment of the present application.

FIG. 3 is a logic block diagram of a super-resolution image acquisition apparatus according to one embodiment of the present application. As shown in FIG. 3, a super-resolution image acquisition apparatus provided in this embodiment of the present application comprises an original image acquisition module 31, a pixel point distribution change module 32, an adjustment image acquisition module 33, and a super-resolution image acquisition module 34.

The original image acquisition module 31 is configured to acquire an image of a to-be-shot scene by an image sensor.

The pixel point distribution change module 32 is configured to change pixel point distribution of the image sensor at least once.

The adjustment image acquisition module 33 is configured to separately acquire an image of the to-be-shot scene by the image sensor changed each time.

The super-resolution image acquisition module 34 is configured to acquire a super-resolution image of the to-be-shot scene according to the acquired images.

After the pixel point distribution change module 32 changes the pixel point distribution of the image sensor each time, the adjustment image acquisition module 33 may be triggered to acquire an image of the same scene.

According to the technical solution provided in the embodiment of the present application, an image is acquired by an image sensor before pixel point distribution is adjusted, then the pixel point distribution of the image sensor is changed at least once, and after each change, an image of the same scene is then separately acquired by the changed image sensor. This is equivalent to acquiring a group of images of the same scene at different time periods, which are similar in content but not completely the same in acquired information about details. A super-resolution image may be generated by performing software processing such as fusing on this group of images, and resolution of the super-resolution image is higher than that of each image of the group of images. In view of this, according to the technical solutions provided in the embodiments of the present application, a super-resolution image may be acquired without using multiple cameras or multiple image sensors, and the solutions are simple and easy to implement, and may better meet users' diversified actual application needs The super-resolution image acquisition apparatus provided in this embodiment of the present application may perform static or dynamic image processing control by executing the super-resolution image acquisition method during applications, which comprise, but are not limited to, phototaking, camera shooting, photographing and video monitoring. A device presentation form of the super-resolution image acquisition apparatus is not limited, for example, the super-resolution image acquisition apparatus may be a separate part, and the part cooperates and communicates with an imaging device such as a camera, a video camera, a mobile phone, or a wearable camera; or, the super-resolution image acquisition apparatus may be integrated into an imaging device as a functional module, which is not limited in this embodiment of the present application.

Figure 4:
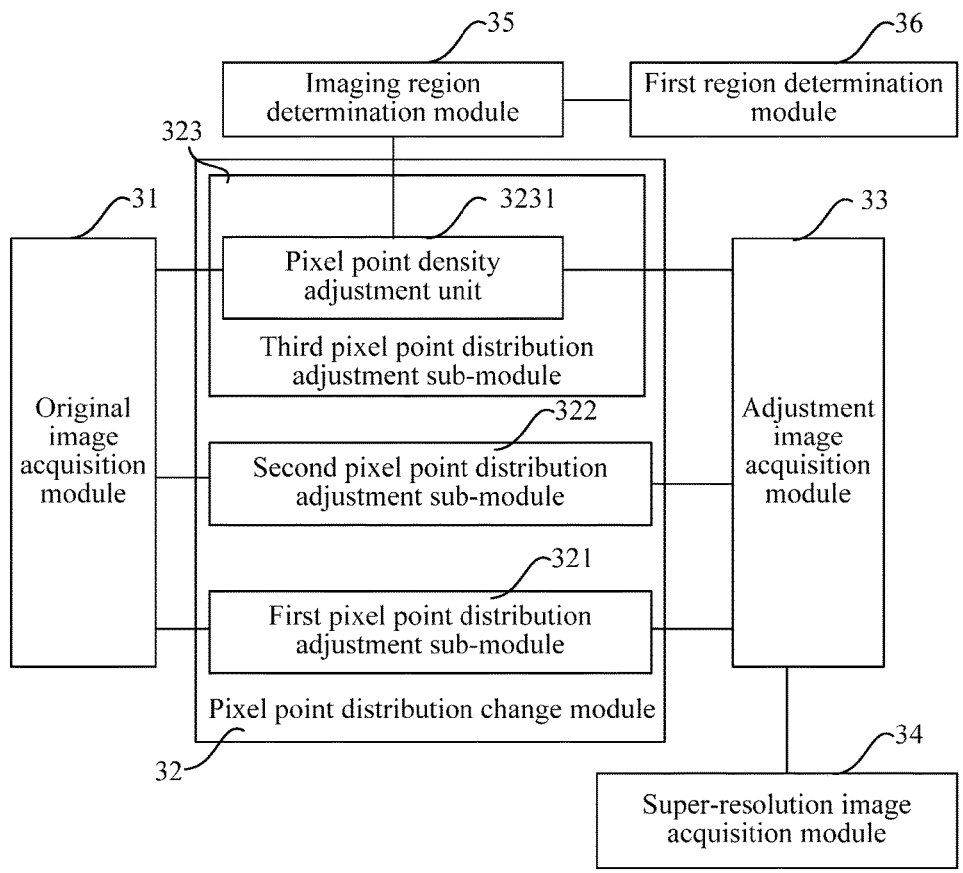
FIG. 4 is a logic block diagram of another super-resolution image acquisition apparatus according to one embodiment of the present application.

Optionally, as shown in FIG. 4, the pixel point distribution change module 32 comprises a first pixel point distribution adjustment sub-module 321. The first pixel point distribution adjustment sub-module 321 is configured to increase an average pixel point density of a first imaging region of the image sensor at least once, where the first imaging region is a part of an imaging region of the image sensor. After the first pixel point distribution adjustment sub-module 321 changes the pixel point distribution of the image sensor each time, the adjustment image acquisition module 33 may be triggered to acquire an image of the same scene.

The solution causes the number of pixel points in the first imaging region of the image sensor to increase and the pixel points to be distributed more densely, that is, an average pixel point density of the first imaging region increases. At this time, a sub-image, corresponding to the first imaging region, in an image of the same scene acquired by the image sensor is richer in details and higher in resolution, while resolution of other sub-images of the image is lower, thereby forming an image in which resolution is distributed variedly.

Optionally, the pixel point distribution change module 32 comprises a second pixel point distribution adjustment sub-module 322. The second pixel point distribution adjustment sub-module 322 is configured to decrease an average pixel point density of a first imaging region of the image sensor at least once, where the first imaging region is a part of an imaging region of the image sensor. After the second pixel point distribution adjustment sub-module 322 changes the pixel point distribution of the image sensor each time, the adjustment image acquisition module 33 may be triggered to acquire an image of the same scene. According to the solution, pixel points in the first imaging region of the image sensor are decreased, to cause pixel points in the first imaging region to be sparser, while an average pixel point density of a second imaging region increases. A sub-image, corresponding to the first imaging region, in an image of the same scene acquired by the image sensor is lower in resolution, while a sub-image corresponding to a second imaging region is richer in details and higher in resolution, thereby forming an image in which resolution is distributed variedly.

Optionally, the acquisition apparatus further comprises an imaging region determination module 35. The imaging region determination module 35 is configured to determine an imaging region, which corresponds to a first region, of the image sensor, where the first region is a local part of the to-be-shot scene. Correspondingly, the pixel point distribution change module 32 comprises a third pixel point distribution adjustment sub-module 323. The third pixel point distribution adjustment sub-module 323 is configured to change pixel point distribution of the determined imaging region at least once. According to the solution, an imaging region, corresponding to a local part of a to-be-shot scene, of the image sensor may be adjusted targetedly, so as to adjust pixel point distribution of the image sensor flexibly. Optionally, the third pixel point distribution adjustment sub-module 323 comprises a pixel point density adjustment unit 3231. The pixel point density adjustment unit 3231 is configured to increase an average pixel point density of the determined imaging region at least once. According to the solution, by increasing an average pixel point density of the imaging region, imaging quality of a sub-image, corresponding to the imaging region, of an image acquired by an image sensor after pixel point distribution is adjusted may be improved.

Optionally, the acquisition apparatus further comprises a first region determination module 36. The first region determination module 36 is configured to determine the first region. According to the solution, a local part of a current to-be-shot scene may be predetermined as the first region according to an actual need, which may better meet users' personalized application needs.

Figure 5:
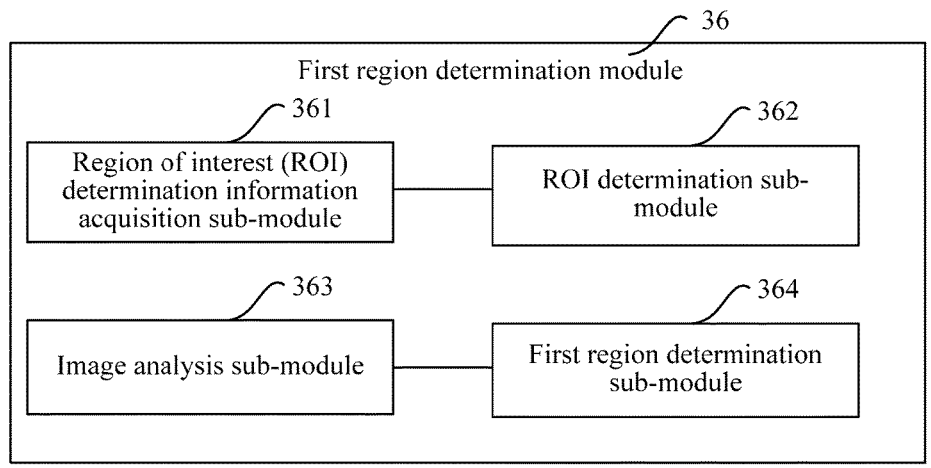
FIG. 5 is a logic block diagram of a first region determination module according to one embodiment of the present application.

Further, optionally, as shown in FIG. 5, the first region determination module 36 comprises an ROI determination information acquisition sub-module 361 and an ROI determining sub-module 362. The ROI determination information acquisition sub-module 361 is configured to acquire, based on a preview image of the image sensor about the to-be-shot scene, ROI determination information; and the ROI determining sub-module 362 is configured to determine a region, corresponding to the ROI determination information, of the to-be-shot scene as the first region. According to the solution, according to the ROI of the preview image, a local part, corresponding to the ROI, of the to-be-shot scene is determined as the first region, to cause determination of the first region to more fit in with actual user demands, thereby better meeting users' personalized application demands.

Optionally, the first region determination module 36 comprises an image analysis sub-module 363 and a first region determination sub-module 364. The image analysis sub-module 363 is configured to perform an image analysis on a preview image of the image sensor about the to-be-shot scene; and the first region determination sub-module 364 is configured to determine the first region according to a result of the image analysis. According to the solution, a region, corresponding thereto, of the to-be-shot scene may be determined as the first region according to an image analysis result of the preview image, to cause determination of the first region to be more intelligent, thereby improving efficiency and universality of the determination of the first region.

Figure 6:
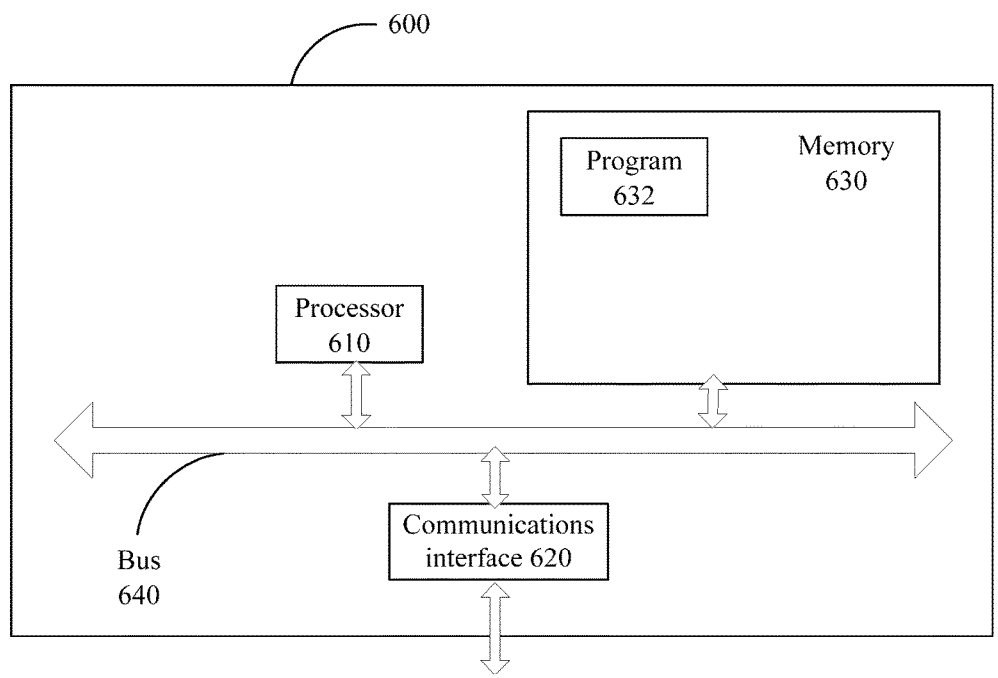
FIG. 6 is a logic block diagram of a further super-resolution image acquisition apparatus according to one embodiment of the present application.

FIG. 6 is a structural block diagram of another super-resolution image acquisition apparatus according to one embodiment of the present application. A specific implementation of a super-resolution image acquisition apparatus 700 is not limited in a specific embodiment of the present application. As shown in FIG. 6, the super-resolution image acquisition apparatus 600 may comprise:

a processor 610, a communications interface 620, a memory 630, and a communications bus 640.

The processor 610, the communications interface 620, and the memory 630 communicate with each other through the communications bus 640.

The communications interface 620 is configured to communicate with a device having a communications function, an external light source, and the like.

The processor 610 is configured to execute a program 632, and specifically, may execute a related step in any one of the foregoing embodiments of the light-field acquisition control method.

For example, the program 632 may comprise a program code. The program code comprises a computer operation instruction.

The processor 610 may be a central processing unit (CPU) or an application specific integrated circuit (ASIC), or may be configured as one or more integrated circuits that implement the embodiments of the present application.

The memory 630 is configured to store the program 632. The memory 630 may comprise a random access memory (RAM), and may also comprise a non-volatile memory, for example, at least one magnetic disk storage.

For example, in an optional implementation, the processor 610 may execute the following steps by executing the program 632: acquiring an image of a to-be-shot scene by an image sensor; changing pixel point distribution of the image sensor at least once; separately acquiring an image of the to-be-shot scene by the image sensor changed each time; and acquiring a super-resolution image of the to-be-shot scene according to the acquired images.

In another optional implementation, the processor 610 may also execute a step in any one of the foregoing other embodiments by executing the program 632, which is not described herein again.

Reference can be made to corresponding description in the corresponding steps, modules, sub-modules and units in the embodiments for specific implementation of the steps in the program 632, which is not repeated herein. Those skilled in the art can clearly understand that, reference can be made to the corresponding process description in the method embodiments for the devices described above and the specific working procedures of the modules, and will not be repeated herein in order to make the description convenient and concise.

Optionally, the image sensor of any camera may be the flexible image sensor described above. Alternatively, the image sensor may further comprise: multiple image sensor pixels array-distributed; and a controllable deformed material portion respectively connected with the multiple image sensor pixels; wherein the controllable deformed material portion can produce deformation under the action of an external field, and density distribution of the multiple image sensor pixels is correspondingly adjusted through the deformation; the external field is controlled by the imaging control apparatus.

Reference can be made to the corresponding description in FIG. 1b to FIG. 1j for the structure of the image sensor, the super-resolution image acquisition apparatus can directly control the external field to control deformation of the controllable deformed material portion, thereby adjusting pixel point distribution of the corresponding image sensor; or the super-resolution image acquisition apparatus can indirectly control the external field by controlling the deformation control portion, to cause the controllable deformed material portion to produce corresponding deformation to correspondingly adjust pixel point distribution of the image sensor; and so on. A manner of physical connection between the image sensor pixels and the deformed material portion can be determined according to actual needs, as long as the manner can meet that pixel density distribution of the image sensor can be adjusted when the deformed material portion produces deformation, which is not limited in the embodiment of the present application, and reference can be made to the corresponding description above for a specific implementation thereof, which is not repeated herein.

In the various embodiments of the present application, the serial numbers and/or sequence numbers of the foregoing embodiments are merely for the convenience of description, and do not imply the preference among the embodiments. Particular emphasis is put on the description about each embodiment, and reference can be made to relevant description of other embodiments for the content not detailed in a certain embodiment. Reference can be made to the description about the corresponding method embodiments for related description about the implementation principle or process of relevant apparatus, device or system embodiments, which is not repeated herein.

It can be appreciated by those of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. Those skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on such understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium comprises various mediums capable of storing program codes, such as, a USB flash drive, a removable hard disk, a read-only memory (ROM), a random access memory (RAM), a magnetic disk or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation, or replace a feature in another implementation.

It should be emphasized that, terms "comprise/contain" used herein refer to existence of a feature, an element, a step, or a component, but do not exclude existence or addition of one or more of other features, elements, steps, or components.

Finally, it should be noted that, the foregoing implementation manners are only used to describe the present application, but not to limit the present application. Those of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A super-resolution image acquisition method, comprising:
   acquiring an image of a scene by an image sensor;
   changing pixel point distribution of the image sensor at least once;
   separately acquiring an image of the scene by the image sensor with changed pixel point distribution; and
   acquiring a super-resolution image of the scene according to the acquired images.

2. The acquisition method of claim 1, wherein the changing pixel point distribution of the image sensor at least once comprises:
   increasing an average pixel point density of a first imaging region of the image sensor at least once, wherein the first imaging region is a part of an imaging region of the image sensor.

3. The acquisition method of claim 1, wherein the changing pixel point distribution of the image sensor at least once comprises:
   decreasing an average pixel point density of a first imaging region of the image sensor at least once, wherein the first imaging region is a part of an imaging region of the image sensor.

4. The acquisition method of claim 2, wherein after pixel point distribution of the image sensor is changed at least once, pixel points within the first imaging region are distributed evenly or unevenly.

5. The acquisition method of claim 2, wherein the first imaging region comprises multiple imaging sub-regions, wherein the multiple imaging sub-regions are distributed dispersively within the image sensor.

6. The acquisition method of claim 1, wherein
the acquisition method further comprises: determining an imaging region, which corresponds to a first region, of the image sensor, wherein the first region is a local part of the scene; and
the changing pixel point distribution of the image sensor at least once comprises changing pixel point distribution of the determined imaging region at least once.

7. The acquisition method of claim 6, wherein the changing pixel point distribution of the determined imaging region at least once comprises:
increasing an average pixel point density of the determined imaging region at least once.

8. The acquisition method of claim 6, wherein the acquisition method further comprises:
determining the first region.

9. The acquisition method of claim 8, wherein the determining the first region comprises:
acquiring region of interest (ROI) determination information based on a preview image of the image sensor about the scene; and
determining a region, corresponding to the ROI determination information, of the scene as the first region.

10. The acquisition method of claim 8, wherein the determining the first region comprises:
performing an image analysis on a preview image of the image sensor about the scene; and
determining the first region according to a result of the image analysis.

11. A super-resolution image acquisition apparatus, comprising:
a processor; and
a memory, the memory storing computer executable instructions when executed by the processor configured to cause the processor to perform:
acquiring an image of a scene by an image sensor;
changing a pixel point distribution of the image sensor at least once;
separately acquiring an image of the scene by the image sensor changed with changed pixel point distribution; and
acquiring a super-resolution image of the scene according to the acquired images.

12. The super-resolution image acquisition apparatus of claim 11, wherein the instructions are further configured to cause the processor to perform:
increasing an average pixel point density of a first imaging region of the image sensor at least once, wherein the first imaging region is a part of an imaging region of the image sensor.

13. The super-resolution image acquisition apparatus of claim 11, wherein the instructions are further configured to cause the processor to perform:
decreasing an average pixel point density of a first imaging region of the image sensor at least once, wherein the first imaging region is a part of an imaging region of the image sensor.

14. The super-resolution image acquisition apparatus of claim 11, wherein the instructions are further configured to cause the processor to perform:
determining an imaging region, which corresponds to a first region, of the image sensor, wherein the first region is a local part of the scene; and
changing pixel point distribution of the determined imaging region at least once.

15. The super-resolution image acquisition apparatus of claim 14, wherein the instructions are further configured to cause the processor to perform,
increasing an average pixel point density of the determined imaging region at least once.

16. The super-resolution image acquisition apparatus of claim 14, wherein determining the imaging region, which corresponds to the first region, of the image sensor further comprises:
acquiring a region of interest (ROI) determination information based on a preview image of the image sensor about the scene; and
determining a region, corresponding to the ROI determination information, of the scene as the first region.

17. The super-resolution image acquisition apparatus of claim 14, wherein determining the imaging region, which corresponds to the first region, of the image sensor further comprises:
performing an image analysis on a preview image of the image sensor about the scene; and
determining the first region according to a result of the image analysis.

18. A computer readable storage apparatus, comprising at least one executable instruction, which, in response to execution, causes a super-resolution image acquisition method, comprising:
acquiring an image of a scene by an image sensor;
changing pixel point distribution of the image sensor at least once;
separately acquiring an image of the scene by the image sensor changed each time; and
acquiring a super-resolution image of the scene according to the acquired images.

19. A super-resolution image acquisition apparatus, comprising a processor and a memory, the memory storing computer executable instructions, the processor being connected to the memory through a communication bus, and when the processor executes the computer executable instructions stored in the memory, it causes the apparatus to perform:
acquiring an image of a scene by an image sensor;
changing pixel point distribution of the image sensor at least once;
separately acquiring an image of the scene by the image sensor changed with changed pixel point distribution; and
acquiring a super-resolution image of the scene according to the acquired images.

* * * * *